(12) United States Patent
Panchapakesan et al.

(10) Patent No.: US 10,785,196 B2
(45) Date of Patent: Sep. 22, 2020

(54) ENCRYPTION KEY MANAGEMENT OF CLIENT DEVICES AND ENDPOINTS WITHIN A PROTECTED NETWORK

(71) Applicant: VMWARE, INC., Palo Alto, CA (US)

(72) Inventors: Ramani Panchapakesan, Bangalore (IN); Suman Aluvala, Bangalore (IN); Niranjan Paramashivaiah, Bangalore (IN); Mahesh Kavatage, Bangalore (IN); Pavan Rajkumar Rangain, Bangalore (IN); Craig Farley Newell, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 269 days.

(21) Appl. No.: 15/913,942

(22) Filed: Mar. 7, 2018

(65) Prior Publication Data

US 2019/0230065 A1    Jul. 25, 2019

(30) Foreign Application Priority Data

Jan. 22, 2018   (IN) .............................. 201841002522

(51) Int. Cl.
*H04L 29/00* (2006.01)
*H04L 29/06* (2006.01)
*H04L 9/08* (2006.01)

(52) U.S. Cl.
CPC ........ *H04L 63/0428* (2013.01); *H04L 9/0891* (2013.01); *H04L 63/029* (2013.01); *H04L 63/0272* (2013.01); *H04L 63/06* (2013.01); *H04L 63/107* (2013.01); *H04L 63/083* (2013.01); *H04L 63/108* (2013.01)

(58) Field of Classification Search
CPC ............. H04L 63/0272; H04L 12/4641; H04L 63/1416; H04L 63/08; H04L 12/1886
See application file for complete search history.

(56) References Cited

U.S. PATENT DOCUMENTS

| 2017/0230281 A1* | 8/2017 | Newell | ............... H04L 12/4641 |
| 2017/0272472 A1* | 9/2017 | Adhar | ................ H04L 63/1425 |

* cited by examiner

*Primary Examiner* — Ghazal B Shehni
(74) *Attorney, Agent, or Firm* — Thomas | Horstemeyer, LLP

(57) ABSTRACT

Disclosed are various examples for establishing encrypted channels or tunnels within a TCP or other communication session between a tunnel endpoint and tunnel client on a client device. A tunnel endpoint on the client device can determine an encryption key based upon whether a client device is in compliance with encryption policies of the enterprise.

17 Claims, 6 Drawing Sheets

ENCRYPTION KEY MANAGEMENT OF CLIENT DEVICES AND ENDPOINTS WITHIN A PROTECTED NETWORK

RELATED APPLICATIONS

Benefit is claimed under 35 U.S.C. 119(a)-(d) to Foreign Application Serial No. 201841002522 filed in India entitled "ENCRYPTION KEY MANAGEMENT OF CLIENT DEVICES AND ENDPOINTS WITHIN A PROTECTED NETWORK", on Jan. 22, 2018, by VMware. Inc., which is herein incorporated in its entirety by reference for all purposes.

BACKGROUND

For security purposes, a mobile device can be configured to route application network traffic through an encrypted network tunnel, such as a virtual private network (VPN). This configuration is especially useful when the mobile device is connected to the Internet through an open Wi-Fi access point, where any device can eavesdrop on the network traffic. This configuration is also useful in situations where the mobile device is connected to a secured network to which untrusted devices can be connected, or if the operator of the network (or intermediate networks) cannot be trusted. Also, the use of a VPN can be necessary to connect to resources hosted on an organization's private network or intranet.

An organization might have different security requirements or preferences for different applications or different classes of data. For example, an organization might require a particular application's network traffic to be routed through a VPN that employs a particular encryption level that is defined by the size of the encryption key used to create an encrypted tunnel over the Internet. More sensitive data might require a greater degree of encryption. Less sensitive data might require less encryption, or a smaller encryption key that is used to encrypt an encrypted channel or encrypted tunnel. In some examples, an organization's policy might allow certain data from certain applications or certain types of data to be sent over a network without any encryption.

However, VPN clients and endpoints often take an all or nothing approach to creating encrypted tunnels. For example, if a VPN configuration specifies that a VPN should be employed for a particular device or user account, a single encrypted channel or tunnel is created, and all network traffic routed by the tunnel client on the device through the tunnel is encrypted in the same way.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to encrypting data in network tunnels for network traffic generated by different applications. In some examples, the present disclosure relates to encrypting data in network tunnels between endpoints within a network that is governed by software defined networking principles, or a protected network, and a device that is external to the protected network. Network communications generated by applications of a mobile device can be routed through one or more encrypted network tunnels over the public Internet to a tunnel endpoint or a software defined networking gateway that governs access to the protected network. The gateway can then forward network traffic to a particular endpoint on an organization's protected network. This can provide the applications with access to protected resources on the organization's private network as well as provide security for transit over untrusted networks.

An organization might allow or require varying levels of encryption depending upon the ambient conditions of a client device that is being used to access a protected network. The ambient conditions can include the geographic location of a client device, the identity of a network to which the client device is connected, or the type of network to which the client is connected. For example, an enterprise might impose a policy that a client device, if it enters a particular country or is attached to a particular network, the device is then barred from accessing endpoints within the protected network. As another example, an enterprise might impose a policy that a client device, if it enters a particular country or is attached to a particular network, the device must encrypt network traffic using an encryption key of u minimum length or using a particular encryption protocol. Examples of this disclosure can provide for a tunnel client and tunnel endpoint that provides a gateway to a protected network that can impose varying levels of encryption based upon the ambient conditions of the client device. Examples of this disclosure can provide for a tunnel client and tunnel endpoint that provide a gateway to a protected network that can manage encryption keys used by the client device to communicate with endpoints within the protected network based upon the ambient conditions of the client device.

Therefore, examples of this disclosure can provide a framework in which a virtual private network (VPN) configuration can specify particular encryption keys that can be used to encrypt network traffic that is sent through a VPN tunnel to a tunnel endpoint that provides access to a protected network. The VPN configuration can cause the operating system of a client device to route network traffic through a tunnel client installed on the device if certain criteria specified by the VPN configuration are met. The VPN configuration can also specify an encryption level for the network traffic.

Figure 1:
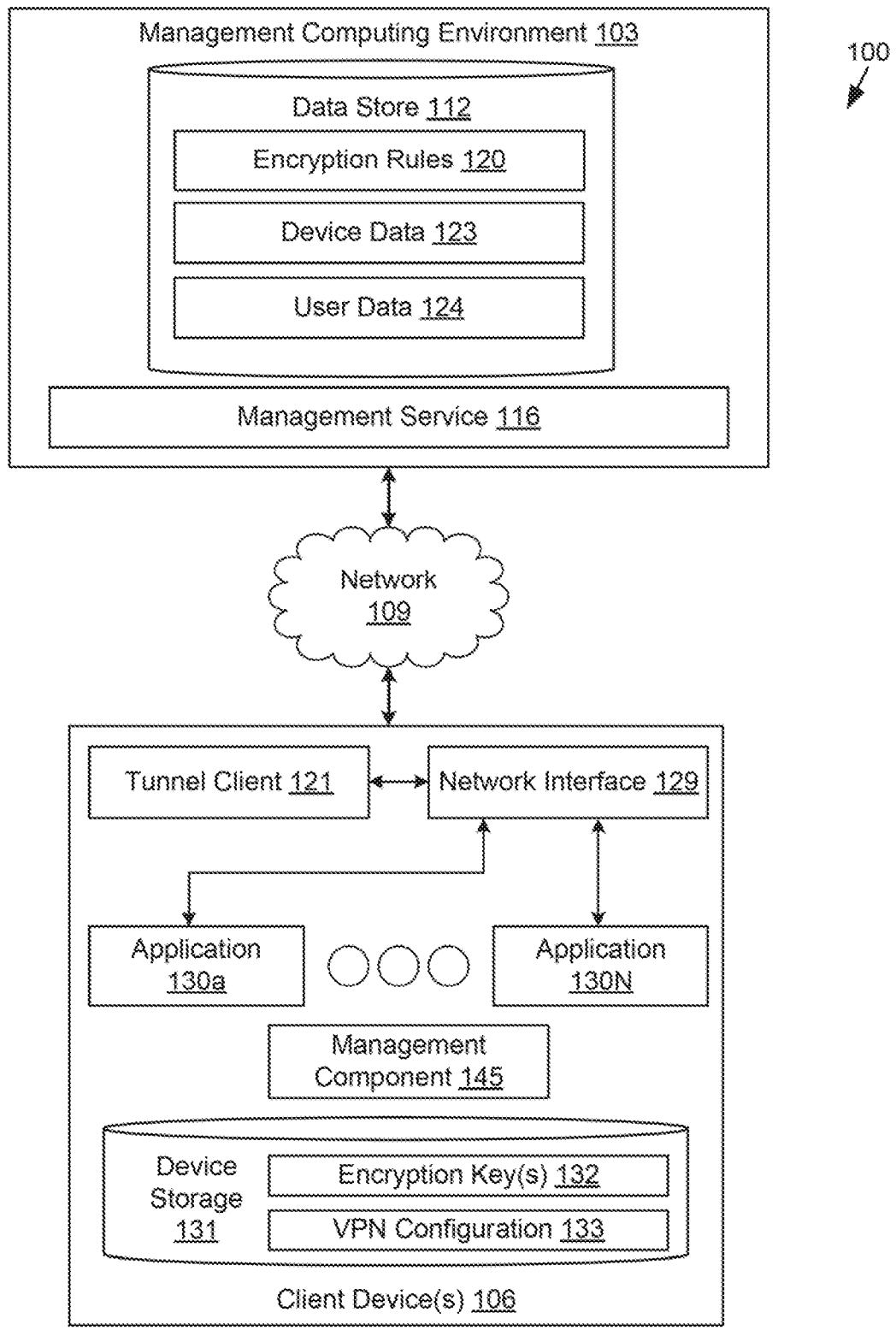
FIG. 1 is a drawing of a networked environment according to various examples of the disclosure.

With reference to FIG. 1, shown is a networked environment 100 according to various examples. The networked environment 100 includes a management computing environment 103 and one or more client devices 106 in communication by way of network 109. The network 109 can include, for example, wide area networks (WANs), local area networks (LANs), wired networks, wireless networks, other suitable networks, or any combination of two or more networks. For example, the network 109 can include satellite networks, cable networks, Ethernet networks, and other types of networks.

The management computing environment 103 can be a computing environment that is operated by an enterprise, such as a business or other organization. The management computing environment 103 can include, for example, a server computer, a network device, or any other system providing computing capabilities. Alternatively, the management computing environment 103 can employ multiple computing devices that can be arranged, for example, in one or more server banks, computer banks, or other arrangements. The computing devices can be located in a single installation or can be distributed among many different geographical locations. For example, the management computing environment 103 can include multiple computing devices that together form a hosted computing resource, a grid computing resource, or any other distributed computing arrangement.

In some cases, the management computing environment 103 can operate as at least a portion of an elastic computing resource where the allotted capacity of processing, network, storage, or other computing-related resources can vary over time. The management computing environment 103 can also include or be operated as one or more virtualized computer instances. Generally, the management computing environment 103 can be operated in accordance with particular security protocols such that it is considered a trusted computing environment. The management computing environment 103 can be located remotely with respect to the client device 106.

Various applications and/or other functionality can be executed in the management computing environment 103. The data store 112 can be representative of a plurality of data stores 112 as can be appreciated. The data stored in the data store 112, for example, is associated with the operation of the various applications and/or functional entities described below.

The components executed on the enterprise computing environment 103 can include a management service 116 and other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116.

The data stored in the data store 112 can include encryption rules 120, device data 123, user data 124, and potentially other data. Encryption rules 120 can specify what encryption level, if any, should be employed for network traffic emanating from a client device 106 on which a VPN configuration is installed. An encryption rule 120 can specify the VPN protocol that should be employed for a particular application, an encryption level, and a network address of a tunnel endpoint.

An encryption rule 120 can also specify or include a certificate or encryption key that should be employed according to the encryption level. The encryption rule 120 can also identify a size of an encryption key used to secure network traffic according to the encryption rule. The encryption rule 120 can further specify an encryption key or encryption level identifier that can be incorporated into a packet header or other portion of packets sent from a device so that a tunnel endpoint can decrypt the traffic and forward to the appropriate destination. In some embodiments, a tunnel endpoint can determine a geographic or network location of a client device 106 based upon one or more attributes embedded within a packet header, such as the network address or IP address that is being used by client device 106.

Device data 123 can include device records corresponding to client devices 106 that are enrolled as managed devices with the management service 116. A device record within device data 123 can include various security settings selected for enforcement on a client device 106 that is enrolled with the management service 116. Accordingly, a device record can include a device identifier associated with a device, such as the client device 106, one or more device certificates, and a compliance status. In some examples, device data 123 can also identify a user associated with a particular client device 106. A device record can also store other device specific information, such as B device type, operating system type or version, applications that are required or optional for the device, or an enrollment status of the device. In this scenario, the device data can also indicate whether a managed device is a computing device or a peripheral device, such as a printer, scanner, or other device that can be deployed in an environment and associated with a record in a directory service.

Various compliance rules can be enforced by the management service 116 by the client device 106. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be based upon the time and date matching specified values.

A compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to prompt a user for a password or personal identification number (PIN) in order to unlock the device.

A compliance rule can also require that the client device 106 have device encryption enabled, where data stored on the device is stored in an encrypted form. A compliance rule can also specify that the client device 106 is enrolled with the management service 116 as a managed device. Another compliance rule can specify that the user is required to accept the terms of service that are presented by the management component 145 on the client device 106. As another example, a compliance rule can specify that the management component 145 is required to periodically communicate or "check-in" with the management service 136 to report on its status. If a threshold amount of time has elapsed since the previous check-in of the client device 106, the device can be considered to have violated this compliance rule.

Another compliance rule can specify that a client device 106 run one of a specified variants or versions of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

User data 124 contains information shout users who are associated with client devices 106 that are enrolled with the management service 116. User data 124 can include profile information about a user, authentication information about a user, applications that are installed on client devices 106 associated with the user, and other user information. For example, user data 127 can include information about client devices 106 that are associated with a user account of the user, enterprise resources to which a particular user has access, such as email, calendar data, documents, media, applications, network sites, or other resources. The user data 127 can also identify one or more user groups of which a particular user is a member, which can in turn define the access rights of the user to one or more enterprise resources as well as identify which applications should be deployed to a client device 106 associated with the user. User data 127 can also identify a user's location or role within an organization. The user data 127 can further identify one or more device identifiers that can uniquely identify client devices 106 that are associated with a user account of the user.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 has an operating system, such as WINDOWS, IOS, or ANDROID, and has a network interface 129 in order to communicate with the network 109. The client device 106 is configured to execute a plurality of different applications 130a . . . 130N. The applications 130 can include email applications, text message applications, video and voice communication applications, business productivity applications, file transfer applications, and so on. The applications 130 communicate with respective services over the network 109 to perform their corresponding functionality, which can include, for example, downloading a web page, downloading an email, sending an email, sending a video stream, receiving a voice stream, downloading hulk data, uploading bulk data, and so forth.

The tunnel client 121 can provide point-to-point tunneling of network traffic between the client device 106 and the tunnel endpoint 218. Network traffic originating from the application 130 can be routed from the network interface 129 to the tunnel client 121 rather than directly to the network 109. The tunnel client 121 can secure the traffic by applying a security layer, such as encryption layer, to the traffic. In other words, the tunnel client 121 can wrap the traffic with an encryption layer. The operating system of the client device 106, in some examples, can also allow virtual private network (VPN) capabilities to be bound to one or more applications 130. In other words, the tunnel client 121 can provide per-app VPN capabilities where some or all network traffic originating from an application 130 is routed through the tunnel client 121. In some examples, traffic routed through the tunnel client 149 can be secured using a device certificate or encryption key generated or obtained by a management component 145. Such a device certificate or key can be installed on the client device 106 upon receiving the device certificate or key from the management service.

Figure 2:
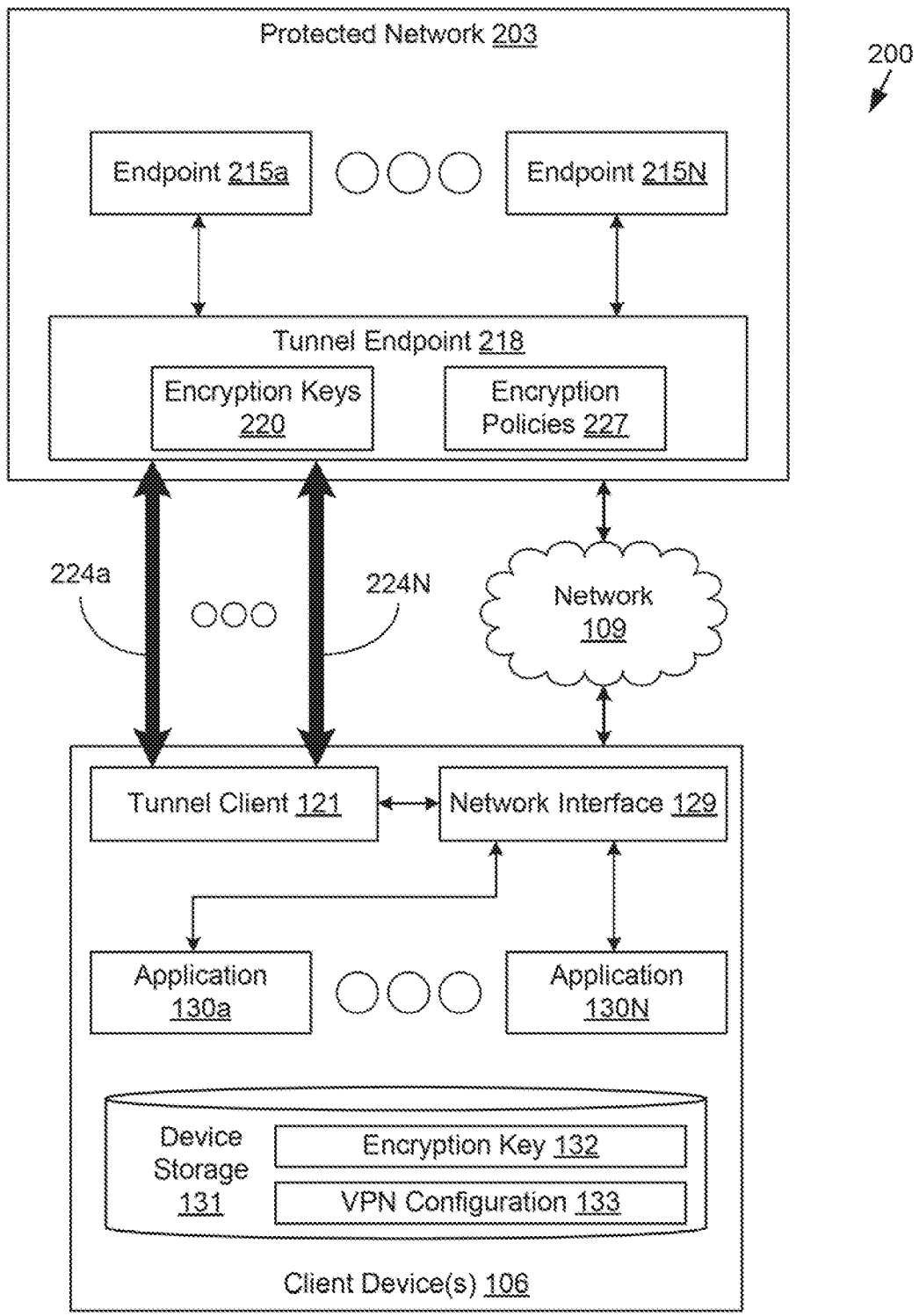
FIG. 2 is a drawing of a networked environment according to various examples of die disclosure.

The client device 106 has a device storage 131 with various data, including application data, operating system data, encryption keys 132. VPN configurations 133, and other data. The encryption keys 132 can be keys of varying length that can be used to secure encrypted network traffic. An encryption key 132 can be used to secure an SSL or transport layer security (TLS) session, for example, that is negotiated between the tunnel client 121 and a remote system or tunnel endpoint over the network 109. The encryption keys 132 can be generated by or on behalf of the management service 116 or the tunnel endpoint 218 (FIG. 2).

A VPN configuration 133 can specify how or whether network traffic originating from an application 130 should be routed by the tunnel client 121 through an encrypted channel over the network 109. The VPN configuration 133 can identify particular applications 130 with a bundle identifier or other unique identifier, categories of applications 130, data types, or particular domain names for which network traffic should be routed to the tunnel client 121. In some scenarios, a separate VPN configuration 133 can be defined for each application 130 installed on the device by taking advantage of per-app VPN capabilities of the client device 106.

The VPN configuration 133 can also specify what device identifying information is embedded into packets that are routed through the tunnel client 121. For example, the VPN configuration 133 can specify that transport layer security (TLS) should be employed to secure traffic from a particular application 130 and that device identifying parameters, such as a network address of the client device 106, a geolocation of the client device 106, a time-stamp, an identity of the application 130, a device identifier of the client device 106, an operating system version, a compliance status of the client device 106, user-identifying information such as a user identifier, or other device identifying parameters can be extracted from the operating system or management component 145 and embedded within a packet header of packets that sent by the tunnel client 121.

The VPN configuration 133 can include a list of settings for a VPN connection to be used by the tunnel client 121 to connect to a corresponding VPN. For example, the VPN configuration 133 can include a username, a password, a digital certificate, an encryption key, an address of a VPN server, such as a tunnel endpoint, a communications protocol (for example, PPP, IPsec, a secure sockets layer (SSL) or TLS-based VPN protocol, or some other VPN protocol) for the VPN connection. In some instances, the VPN configuration 133 can also specify values for various settings of the tunnel client 121. For example, the VPN configuration 133 can specify which Domain Name System (DNS) servers to use with the runnel client 121, which Internet protocol (IP) address or addresses to assign to or associate with the tunnel client 121, the subnet mask of the tunnel client 121, the media access control (MAC) address to assign to or associate with the tunnel client 121, and potentially other settings for the tunnel client 121. These various settings can be considered device identification parameters that are embedded within the security layer or packet headers of packets sent by the tunnel client 121 to a tunnel endpoint 218.

The VPN configuration 133 can be obtained by the management component 145 from the management service 116 and installed is a profile on me client device 106. In one example, the management service 116 can initiate installation of a particular application 130 and generate or update a VPN configuration 133 that can be transmitted to and installed by the management component 145 on the client device 106. The VPN configuration 133 can be specifically generated or updated in response to the installation of the application 130 or in response to a service such as the tunnel endpoint 218 generating and/or deploying a new encryption key to the client device 106.

The client device 106 can execute a management component 145 that can communicate with the management service 116 to facilitate management of the client device 106. The management component 145 can communicate with the management service 116 to enforce management policies and compliance rules on the client device 106. For example, the management component 145 can enforce data security requirements, install, remove or update security certificates and encryption keys, or write, modify or delete certain data from the client device 106. The management component 145 can also monitor network activity of the client device 106, the location of the client device 106, enforce password or personal identification number (PIN) requirements, or any other security or acceptable-use policies that are defined in the management service 116 and sent to the management component 145 over the network 119.

To carry out local management of a client device 106, the management component 145 can be installed and executed with elevated or administrative privileges on the client device 106. In some scenarios, the operating system can allow a particular application or package to be identified as a device owner or a device administrator.

In one example, the management service 116 can create a device record for the client device 106 within the device data 123 and store it in the data store 112. The device record can include data related to the management of the client device 106 by the management service 116. For example, the device record can include one or more of: data describing the identity, type and components of the client device 106; the state of the client device 106; organizational groups to which the client device 106 belongs; compliance rules with which the client device 106 must comply; management policies that specify if, when and how the client device 106 is permitted to function; and a command queue associated with the client device 106.

For example, data describing the identity, type and components of the client device 106 can specify at least one of more of: a unique identifier associated with the client device 106 (e.g., identifier issued by a manufacturer of the client device or the management service 116), a device type of the client device (e.g., a smartphone, a tablet computing, a laptop computer, a desktop computer, a server computer, or a virtualized instance of any of such computer types), and various software and hardware components of the client device 106 (e.g., operating system (or kernel or bios) type and version, processor type and speed, memory type and si/e, network interlace types, various I/O component types such as camera, touchscreen, keyboard, mouse, printer). More particularly, a device record associated with a client device 106 comprising a network connection television can specify that the client device 106 is a device type of television can specify that the client device 106 has a wireless network interface and that the client device 106 has an active connection to the Internet.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 116, whether the client device 106 is in a state of compliance with any applicable compliance rules, and whether any remedial actions have been (or are to be) taken as a result of a noncompliance with any applicable compliance rules.

Next, data describing compliance rules with which the client device 106 must comply can, for instance, specify one or more remedial actions that should be performed in the event that an associated rule condition occurs, as described later herein. Further, data describing management policies can include permissions of the client, device 106 (e.g., access rights) and settings that are being enforced upon the client device 106 (to control if, when and how the client device 106 is permitted to function).

Finally, the device record can include data describing a command queue associated with the client device 106. For example, the management service 116 can maintain a command queue of commands that are designated for execution against the client device 106. As described herein, a client device 106 can be provisioned by the management service 116 by causing resources to be installed or stored on the client device 106. To implement such a process, the management service 116 can store a command related to provisioning in the command queue. Additionally, the management service 116 can store a command related to a remedial action associated with a compliance rule in the command queue in the event that it is determined that a rule condition associated with the compliance rule has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Accordingly, the management service 116, in the above framework, can generate a VPN configuration 133 that can specify which applications or types of network traffic should be routed through the tunnel client 121 and also specify what encryption level or encryption key should be employed for the network traffic, for example, the VPN configuration 133 can specify that network traffic originating from a particular application should be sent through the tunnel client 121 and encrypted using a particular encryption key. The management service 116 can also deploy a new encryption key 132 to a client device 106 should a previous encryption key 132 be revoked by the tunnel endpoint 218 or another service that has the authority to revoke the encryption key 132. In this way, examples of this disclosure can provide flexibility in encrypting different network traffic in different ways rather than encrypting all network traffic being routed through the tunnel client 121 in the same way.

Reference is now made to FIG. 2, which illustrates an alternative networked environment 200 in which the client device 106 has been provisioned with a VPN configuration 133 that specifies the encryption key 132 that the tunnel client 121 should use to communicate with a tunnel endpoint 218 that acts as a gateway to a protected network 203. The tunnel endpoint 218 can apply software defined networking principles to route traffic between client devices 106 or other nodes that are external to the protected network 203 and endpoints 215 that are within the protected network 203. The tunnel endpoint 218 can also examine packets received from the client device 106 to determine whether the client device 106 has been potentially compromised or is in violation of compliance rules and make decisions regarding the routing of traffic from the client device 106 to endpoints 215 within the protected network 203.

The VPN configuration 133 stored on the client device 106 can also outline the various encryption levels that should be applied to various forms of network traffic originating from various applications 130 installed on the client device 106. The networked environment includes one or more client devices 106 and a protected network 203 in data communication over a network 109.

The protected network 203 can represent a network such as a corporate intranet or another form of secure network that is protected in some way from nodes that are external to the protected network 203, such as on the Internet. The protected network 203 can be protected by a firewall and accessible through a tunnel endpoint 218, which can act as a gateway to nodes on the protected network 203 that are authorized by the tunnel endpoint 218. The tunnel endpoint 218 can route traffic to the nodes on the protected network 203 and route traffic from nodes on the protected network 203 to an external network 109. Endpoints 215 within the protected network 203 can represent physical or virtual machines that are not directly exposed to the network 109 or other external networks. The tunnel endpoint 218 acts as a gateway to the network 109 through which devices such as the client device 106 can communicate with endpoints 215. The tunnel endpoint 218 can enforce routing or security policies that are defined by an administrator to maintain the security and separation of the protected network 203 from risks and vulnerabilities posed by nodes on external networks.

As noted above, the tunnel endpoint 218 can employ software defined networking principles to route traffic to and from the protected network 203. In this way, the tunnel endpoint 218 can act as a controller for the protected network 203. In one example, the tunnel endpoint 218 can obtain network traffic from a client device 106 and route the traffic to an appropriate micro-segment on the protected network 203 based upon information that the tunnel endpoint 218 can extract from the packet headers associated with the traffic. The tunnel endpoint 218 can also maintain and manage one or more encryption keys 220. The encryption keys 220 can be used by endpoints 215 within the protected network 203 to communicate among each other and with nodes that are external to the protected network 203, such as the client device 100.

The encryption keys 220 can be managed and generated by the tunnel endpoint 218. The tunnel endpoint 218 can issue an encryption key 220 to endpoints 215 on the protected network 203. The endpoints 215 can then use the encryption key 220 to communicate over the protected network 203 or over the network 109 through the tunnel endpoint 218. In some embodiments, the endpoints 215 can maintain or store multiple encryption keys 220 that can be used to encrypt network traffic to different endpoints 215 or client devices 106. For example, a particular endpoint 215 can maintain a unique encryption key 220 that is used to secure network traffic to each client device 106 external to the protected network 203 with which it communicates.

The endpoints 215 can provide various applications, services, processes, systems, engines, or functionality not discussed in detail herein. The endpoints 215 represent one or more physical or virtual machines that can provide a variety of services to other endpoints 215 or client applications executed on the client devices 106. The services can pertain to email, web servers, file storage and transfer, video and voice telephony, social networking, business sales and contact management, inventory management, task (racking, and so on.

The tunnel endpoint 218 can communicate with a tunnel client 121 on the client device 106 over the network 109 by way of tunnels 224a . . . 224N. In some examples of a tunnel client 121, all network traffic is routed through a server process to determine a termination point for the network traffic on the network 109. In other examples of a tunnel client 121, the tunnel client 121 employs split routing, where traffic that is destined for a network address on an external network is sent to the termination point on the network 109, and traffic destined for the protected network 203 is sent to the tunnel endpoint 218, which routes traffic to an internal network destination, such as a particular network micro-segment or endpoint 215 on the protected network 203. Both the tunnel endpoint 218 and the tunnel client 121 can be configured to apply various encryption levels or various encryption keys to various types of network traffic for transit through the tunnels 224.

The tunnel endpoint can also house encryption policies 227, which can reflect the encryption rules 120 accessible to the management service 116 but can be stored in a different format or translated for use by the tunnel endpoint 218. The encryption policies 227 can specify how the tunnel endpoint 218 can process different types of network traffic received from a tunnel client 121 as well as the policies that determine what level of encryption should be applied to network traffic to or from a particular client device 106 or endpoint 215. The encryption policies 227 can also specify when an encryption key should be revoked from a client device 106 or endpoint 215 as well as when a new encryption key should is issued.

For example, the encryption policies 22 can specify an encryption level and an encryption key for a particular encrypted channel negotiated within a TCP session between the tunnel endpoint 218 and a tunnel client 121 when the tunnel client 121 is in a particular geographic or network location. An encryption policy 227 can also specify when an encryption key that is issued to a client device 106 or endpoint 215 should be revoked based upon the compliance status of the client device 106.

The tunnel endpoint 218 can negotiate SSL, TLS, or other types of encrypted or secured communication sessions with a tunnel client 121. The tunnel endpoint 218 can receive a request to establish an encrypted channel from the tunnel client 121. The tunnel endpoint 218 and tunnel client 121 can establish a TCP session within which one or more SSL or TLS sessions can be established. The tunnel endpoint 218 can also determine a device posture of the client device 106 based upon information embedded in TCP or SSL/TLS packets that are received from the client device 106. In some examples, the tunnel client 121 can embed information about the compliance of the client device 106 with compliance rules into packet headers that the tunnel endpoint 218 can examine. In other scenarios, the tunnel endpoint 218 can determine the compliance of the client device 106 with encryption policies 227 that are related to a device location, network location, or network type based upon network address information that is embedded in packet headers received from the tunnel client 121. Network type can include properties of the network to which the client device 106 is connected. For example, network properties can include whether the network is a wide-area network, a secure wireless network, a wireless network in which there is no encryption or security, or an internet service provider to which the client device 106 is connected. Based upon the compliance of the client device 106 with one or more encryption policies 227 or compliance rules that are established by the enterprise, encryption keys 132 issued to client devices can be issued and/or revoked by the tunnel endpoint 218 or management service 116. Additionally, varying encryption levels or encryption strength can be utilized depending upon the compliance of the client device 106 with encryption policies 227 or compliance rules.

Figure 3:
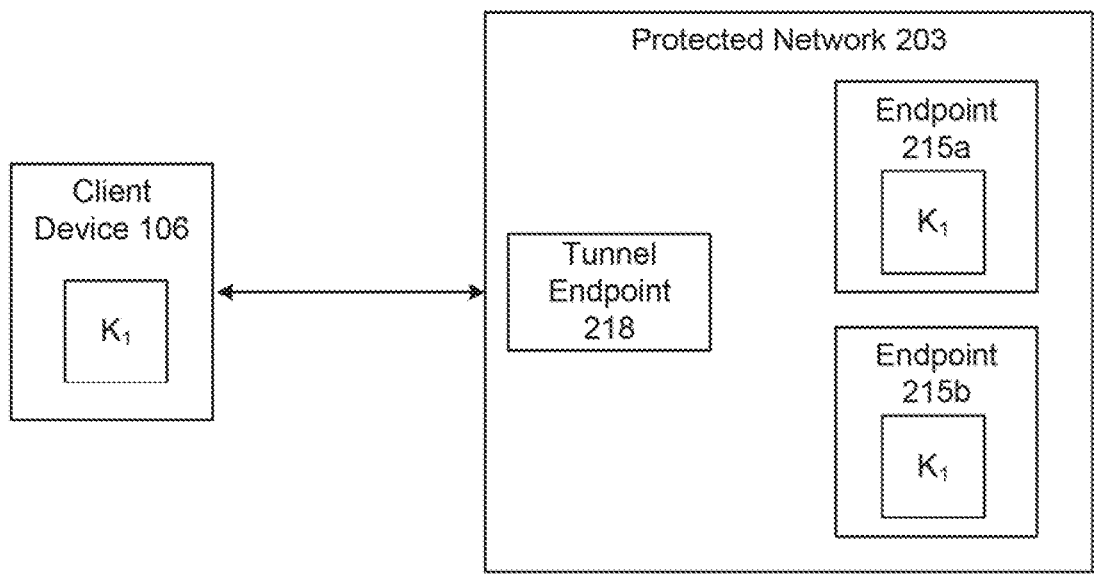
FIG. 3 is a drawing of a scenario according to various examples of the disclosure.
Figure 4:
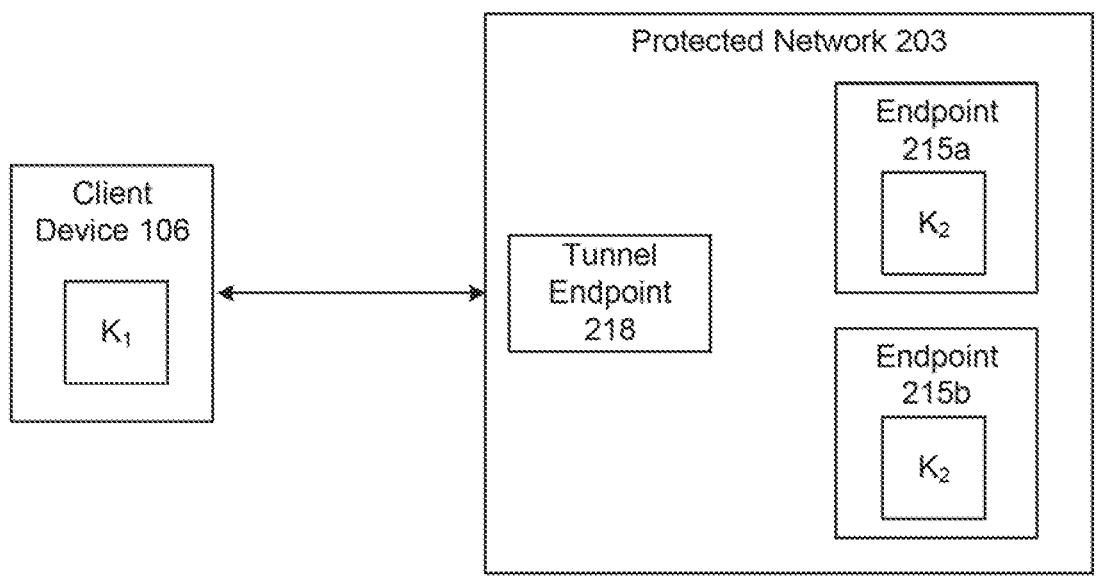
FIG. 4 is a drawing of a scenario according to various examples of the disclosure.
Figure 5:
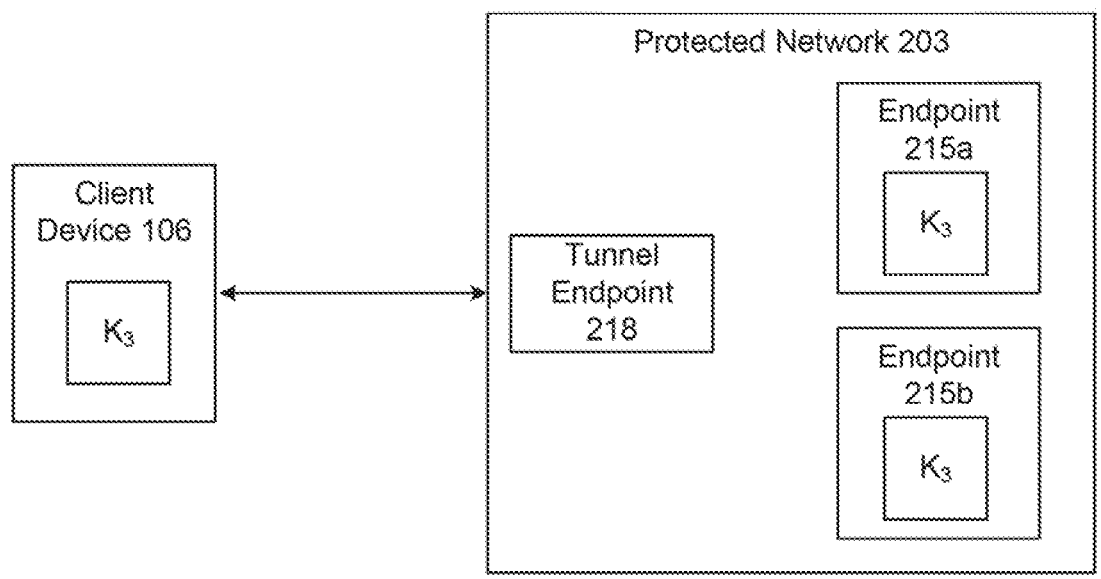
FIG. 5 is a drawing of a scenario according to various examples of the disclosure.

Turning now to FIGS. 3-5, shown is a scenario that illustrates how the tunnel endpoint 218 can enforce encryption policies 22 that are dependent upon compliance of the client device 106 with compliance rules enforced by the management component 145 or encryption policies 227 that can be enforced by the tunnel endpoint 218 based upon information that can be extracted from packets received from the tunnel client 121.

In the scenario shown in FIG. 3, the client device 106 has been issue an encryption key $K_1$ by the management service 116 or tunnel endpoint 218 in a VPN configuration 133 installed on the client device 106. The VPN configuration 133 can be issued to the management component 145, which can install the encryption key 132 on the client device 106 for use by the tunnel client 121. The encryption key $K_1$ can be generated by or on behalf of the tunnel endpoint 218 and also issued to endpoints 215a and 215b within the protected network 203. The tunnel endpoint 218 can also act as a gateway to the protected network 203 and facilitate communication between the endpoints 215a, 215b and the client device 106. The traffic between these nodes can be encrypted or protected using the encryption key $K_1$.

The tunnel endpoint 218 can examine packets received from the client device 106 and forward them to an appropriate destination within the protected network 203, such as endpoints 215a, 215b. The tunnel endpoint 218 can also allow the endpoints 215a, 215b to send traffic to the client device 106 by routing traffic from the endpoints 215a, 215b, to the client device 106.

The tunnel endpoint 218 can also examine packets received from the client device 106 to determine whether the client device 106 is in compliance with compliance rules associated with the management service 116 with which it is enrolled as a managed device. The tunnel endpoint 218 can also determine whether the client device 106 is in compliance with one or more encryption policies 227 that are enforced by the tunnel endpoint 218. In one example, the tunnel endpoint 218 can determine the network location or geographic location of a client device 106 based upon information embedded within packet headers of network traffic received by the tunnel endpoint 218 from the client device 106. For example, the tunnel client 118 can embed geographic coordinates of the client device 106, or a network address, which can be correlated to a geographic location, into the packet headers or encrypted or unencrypted packets that are sent to endpoints 215 and routed through the tunnel endpoint 218. Additionally, the tunnel endpoint 218 can also determine what type of network the client device 106 is attached to based upon the sending network address of the client device 106. As noted above, the tunnel endpoint 218 can act as a gateway to the protected network 20 through which packets sent by the client device 106 to endpoints 215 are routed through.

Accordingly, if the tunnel endpoint 218 determines that the network location, geolocation, or network type that is associated with the client device 106 violate an encryption policy 227 or a compliance rule, it can revoke the encryption key $K_1$ that was assigned to the client device 106. For example, the enterprise can setup a rule that requires the client device 106 to be in a particular geographic area (or not in a prohibited geographic area) or attached to a particular type of network to be permitted to communicate with endpoints 215 on the protected network 203.

In one example, the key revocation process can take the form of the tunnel endpoint 218 issuing a new encryption key to certain nodes on the protected network 203 and ignoring additional network traffic encrypted with encryption key $K_1$ that is received from the client device 106. Tinning now to FIG. 4, such a scenario is illustrated. In the example of FIG. 4, if the packet headers attached to incoming network traffic from the client device 106 indicate that the client device 106 violates an encryption policy 227, the tunnel endpoint 218 can issue a new encryption key $K_2$ to the endpoints 215a, 215b that are attached to the protected network 203. Network traffic received from the client device 106 that is encrypted using the old encryption key $K_1$ can be discarded. The encryption key $K_2$ can be generated by or on behalf of the tunnel endpoint 218, which can issue a VPN profile or other configuration data to the endpoints 215a, 215b that instructs the endpoints 215a, 215b to revoke encryption key $K_1$ and to use encryption key $K_2$. In one example, the tunnel endpoint 218 can issue encryption key $K_2$ as an encryption key with a longer key length than encryption key $K_1$.

Accordingly, the tunnel endpoint 218 can continue to receive network traffic from the client device 106 that is has determined is compromised or otherwise out of compliance with a compliance rule or encryption policy 227, but the traffic, encrypted with encryption key $K_1$, is discarded or otherwise kept from the endpoints 215 on the protected network 203. The endpoints 215 on the protected network 203 can use encryption key $K_2$ to encrypt communications among themselves or to other uncompromised client devices 106 through the tunnel endpoint 218.

The tunnel endpoint 218 can subsequently determine that the client device 106 has returned to compliance or has become uncompromised. Accordingly, a new encryption key can be issued to the client device 106 and the endpoints 215a. 215b on the protected network 203. The new encryption key $K_3$ can be used by the various nodes to encrypt communications between one another, with the tunnel endpoint 218 acting as the gateway between the protected network 203 and the client device 106. The tunnel endpoint 218 can continue to inspect packets received from the client device 106 to determine whether it is in compliance with compliance rules or encryption policies 227 that govern the conditions under which it is allowed to access the protected network 203.

Figure 6:
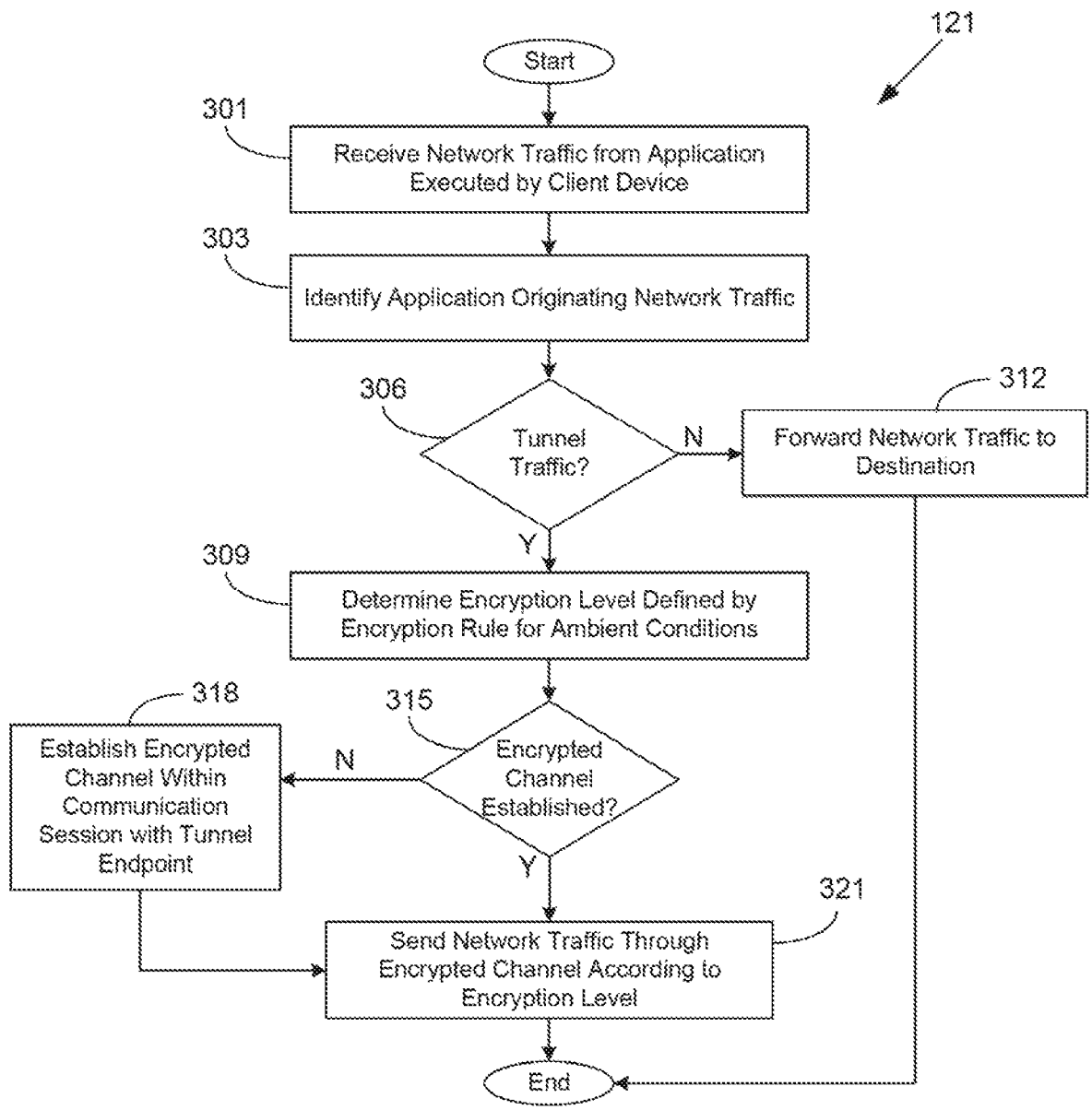
FIGS. 6-7 are flowcharts illustrating examples of functionality according to various examples of the present disclosure.

Turning now to FIG. 6, shown is a flowchart that provides one example of the operation of the tunnel client 121. Functionality attributed to the tunnel client 121 can be implemented in a single process or application or in multiple processes or applications. The separation or segmentation of functionality as discussed herein is presented for illustrative purposes only.

At step 301, the tunnel client 121 can receive network traffic from an application executed by the client device 106. In one example, the network traffic is destined for one or more services 115. The network traffic is destined for one or more services 115. For instance, an application 130 might be an email client that is sending network traffic to an entail server to retrieve or sent an email message. As another example, an application 130 might be a file storage application that is attempting to store or retrieve a file from a file storage service in the protected network 203.

At step 303, the tunnel client 121 can identify the application originating the network traffic. The application 130 can be identified by a bundle identifier associated with one or more packets generated by the application 130. The application 130 can also be identified by the operating system of the client device 106, as the network traffic is often forwarded to the tunnel client 121 through the network stack of the operating system.

At step 306, the tunnel client 121 can determine whether to tunnel the network traffic to the tunnel endpoint 218 or to forward the network traffic directly to its destination (for example, a service 115) by way of a default gateway on the network 109. As specified in the VPN configuration 133, some applications 130 can be set up to use a per-app VPN, while other applications 130 can be configured not to use a VPN. If the tunnel client 121 determines that the particular network traffic is to be tunneled, the tunnel client 121 can proceed to step 309. If the tunnel client 121 determines that the particular network traffic is not to be tunneled, the tunnel client 121 can proceed to step 312.

At step 309, the tunnel client 121 can determine the encryption level of the network traffic according to the VPN configuration 133 configured on the client device 106. The VPN configuration 133 can map an application to an encryption level, which specifies an encryption key size or whether encryption is even required. The VPN configuration 133 can also specify a particular encryption key installed on the client device 106 that should be used to encrypt the network traffic. The VPN configuration 133 can also specify that network traffic destined for a particular domain or IP address range should be encrypted using a particular encryption key-strength.

The VPN configuration 133 can also specify that network traffic conforming to a particular protocol should be encrypted using a particular encryption key strength. The configuration can further specify that network traffic associated with applications 130 of a particular category or class should be encrypted. In this scenario, the VPN configuration 133 can identify multiple applications 130 by a bundle identifier and associate the applications 130 with a particular encryption key or encryption level. The VPN configuration 133 can identify multiple applications 130 by a keyword that the tunnel client 121 can identify within the bundle identifier or other application metadata, and the keyword can be associated with a particular encryption key or encryption level.

At step 315, the tunnel client 121 can determine, according to the encryption level associated with the application and/or network traffic, whether an encrypted channel using the specified encryption key has been established with the tunnel endpoint 218. In one example, the tunnel client 121 can maintain one or more SSL, TLS, or other encrypted sessions within a TCP session with the tunnel endpoint 218. The tunnel client 121 can maintain a state of encrypted channels that have been established with the tunnel endpoint 218 to make the determination of step 315. For example, the tunnel client 121 can maintain a table or other data structure that indicates the encryption key and encryption level or an encryption key size, associated with multiple encrypted channels established with the tunnel endpoint within a communication session. The communication session can include a TCP session. If an encrypted channel of the encryption level determined at step 315 has already been established and is currently active or open with the tunnel endpoint 218, the tunnel client can proceed to step 321, which is described below.

If an encrypted channel of the encryption level determined at step 315 is not established and currently active or open with the tunnel endpoint 218, the tunnel client can proceed to step 318. At step 318, the tunnel client 121 can establish an encrypted channel with the encryption level and encryption key specified by the VPN configuration 143 for the network traffic.

The tunnel client 121 can use an encryption key 132 that is installed on the client device 106 by the management component 145 and/or the management service 116. The encryption key 132 can be revoked by the tunnel endpoint 218 and a new encryption key 132 issued to the client device 106. The new encryption key 132 can be issued to the client device 106 through the management service 116, which can cause the management component 145 to update the VPN configuration 143 with an updated encryption key 132. The encryption key 132 can be stored in the data store 212 accessible to the tunnel client 121 and associated with the encryption rules 120. To establish the encrypted channel, the tunnel client 121 can negotiate an SSL or TLS session with the tunnel endpoint 21 using an encryption key or certificate of a strength that is specified by the VPN configuration 143.

In one example, the tunnel client 121 can generate IPv4 or Ipv6 packets for the network traffic that are encrypted according to SSL or TLS using the appropriate encryption key. The packets can be constructed by prepending or appending an encryption key identifier, which identifies the encryption key that was used to encrypt the packet. An SSL or TLS encrypted packet can be generated, inside of which is a VPS header and/or the encrypted data, or the IPv4 or IPv6 packet that is encrypted. The header can include other information, such as geolocation data and a network address, which the tunnel endpoint 218 can use to determine whether the client device 106 complies with compliance rules and encryption policies 227 enforced by the tunnel endpoint 218.

At step 321, the tunnel client 121 forwards the network traffic to the tunnel endpoint 218 by way of a tunnel 224. In so doing, the tunnel client 121 can transport the packets over a VPN tunnel that can be encrypted. The packets corresponding to the tunneled traffic are forwarded to the default gateway of the network 109 for routing to the tunnel endpoint 218, rather than directly to the endpoints 215 within the protected network 203. Thereafter, the process can proceed to completion.

If the network traffic received at step 301 is determined not to be tunneled at step 306, the tunnel client 121 can proceed to step 312 and forward the network traffic directly to the destination by way of the default gateway of the network 109 without tunneling. Thereafter, the process can proceed to completion.

Figure 7:
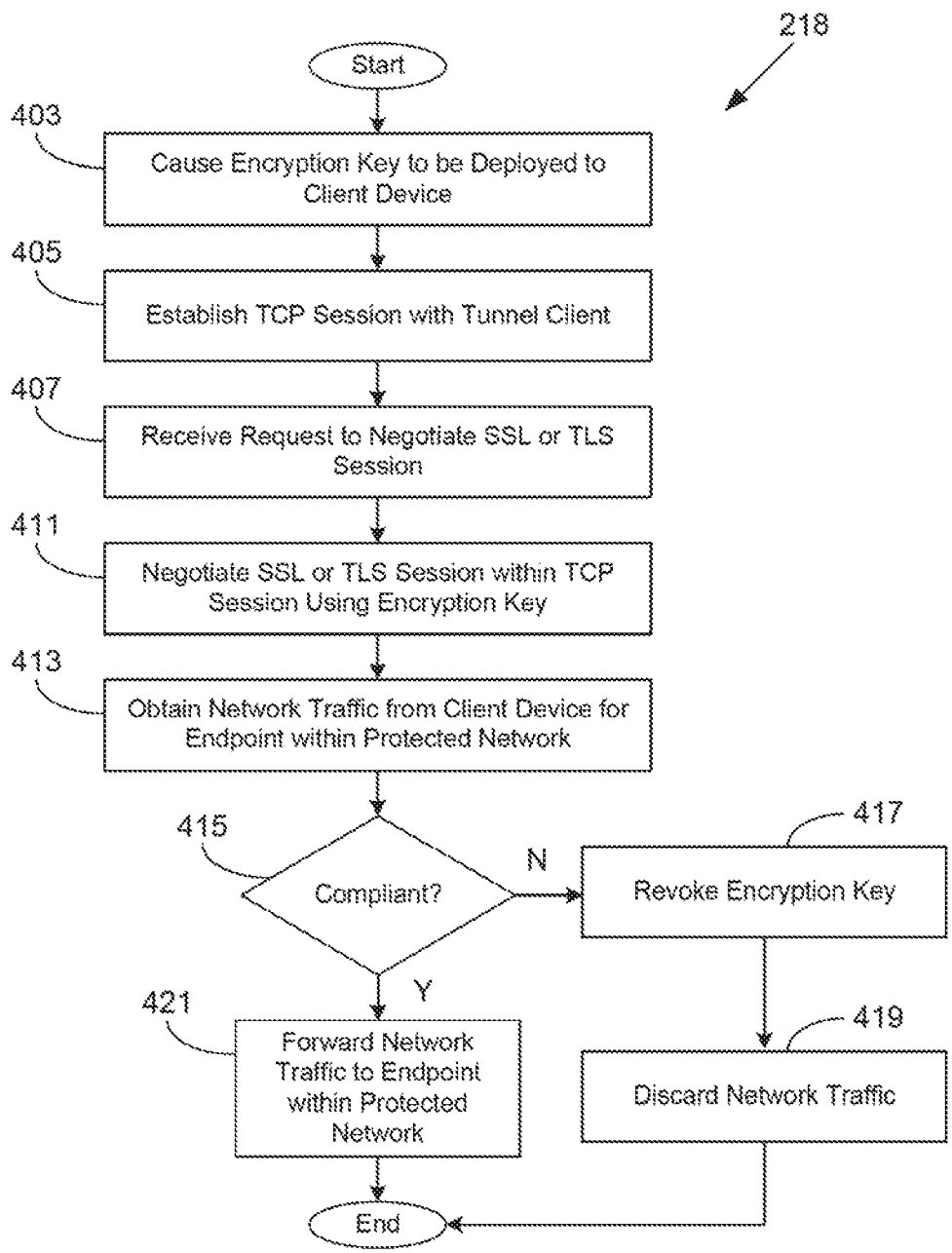

Continuing to FIG. 7, shown is a flowchart that provides one example of the operation of the tunnel endpoint 218. Functionality attributed to the tunnel endpoint 218 can be implemented in a single process or application or in multiple processes or applications. The separation or segmentation of functionality as discussed herein is presented for illustrative purposes only.

Beginning with step 403, the tunnel endpoint 218 can cause an encryption key 132 to be deployed to a client device 106. The encryption key 132 can be deployed through a VPN configuration 233 transmitted to and installed on the client device 106 by the management service 116 and management component 145. The encryption key 132 can be used to encrypt communications with endpoints 215 on the protected network 203, with the tunnel endpoint 218 acting as a gateway to the protected network 203.

At step 405, the tunnel endpoint 218 can establish a TCP session with a tunnel client 121. The TCP session is a communication session within one or more encrypted channels can be established according to varying encryption levels and using various encryption keys 132. The TCP session can be a persistent session or a communication session that is created and/or destroyed as and when the session is required for communication between the tunnel client 121 and tunnel endpoint 218.

Next, at step 407, the tunnel endpoint 218 can receive a request to negotiate or establish an SSL or TLS session according to a particular encryption level using a particular encryption key. The encryption level can specify the strength of the encryption key used to encrypt packets that are received within an encrypted channel from the tunnel client 121. The encryption key can be identified based upon a key signature or identifier that was deployed with the encryption key to the client device 106. In one example, the request can identify a particular encryption rule 221 that the tunnel endpoint 218 can apply to encrypt communications between the tunnel endpoint 218 and tunnel client 121.

At step 411, the tunnel endpoint 218 can negotiate an SSL or TLS session within the TCP session established with the tunnel client 121. The SSL or TLS session is established according to the identified encryption level and using the encryption key identified at step 407.

At step 413, the tunnel endpoint 218 can obtain network traffic from the tunnel client 121. The network traffic can be encrypted using an encryption key and at a particular encryption level as specified by the VPN configuration 133 deployed to the client device 106.

At step 415, the tunnel endpoint 218 can determine whether the client device 106 is compliant with a compliance rule and/or an encryption policy 227 that specifies that the client device 106 is permitted to communicate with the protected network 203. The determination can be made based upon information embedded in the network traffic. A compliance or encryption policy 227 can specify whether the client device 106 is permitted to communicate with the protected network 203 based upon certain ambient conditions related to geolocation or network location. The tunnel endpoint 218 can determine whether the client device 106 is compliant based upon geolocation or network location data that can be determined from the packet headers associated with the network traffic.

In some examples, the tunnel endpoint 218 can extract a device identifier from the network traffic and send a request to the management service 116, which can return an indication of whether the client device 106 should be allowed to communicate with the protected network 203. In this scenario, the management service 1166 can return a positive or negative indication based upon whether the client device 106 is in compliance with any of various compliance rules that are enforced by the management service 116 and/or management component 145 on the client device 106. In this way, access to the protected network 203 can be conditioned on any compliance or encryption policy 227 and not only the geolocation and network location of the client device 106.

At step 421, if the tunnel endpoint 218 determines that the client device 106 is compliant with the various compliance rules or encryption policy 227 based upon an analysis of network traffic at step 415, the tunnel endpoint 218 can forward the network traffic to an endpoint 215 on the protected network 203 to which the traffic was addressed.

At step 417, if the tunnel endpoint 218 determines that the client device 106 was non-compliant at step 415, the tunnel endpoint 218 can revoke the encryption key issued to the client device 106 and the endpoints 215 on the protected network 203 that are using the same encryption key. The tunnel endpoint 218 can revoke the encryption key by issuing a new encryption key to other nodes, such as endpoints 215 on the protected network 203 and potentially other client devices 106 along with an instruction that the nodes should use the newly issued encryption key moving forward.

At step 419, the tunnel endpoint 218 can discard the network traffic received from the non-compliant client device 106. The tunnel endpoint 218 can discard the network traffic because the traffic can be deemed as potentially dangerous because it originated from a potentially compromised client device 106. Thereafter, the process proceeds to completion.

The flowcharts of FIGS. 3-5 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The management computing environment 103 and the client devices 106 or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that ore executable by the one or mere processors of the processing circuit. For example, the applications 130, the tunnel client 121, the tunnel endpoint 218, and/or other components can be stored in one or more storage devices and be executable by one or more processors. Also, a data store can be stored in the one or more storage devices.

The applications 130, the tunnel client 121, the tunnel endpoint 218, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any ion-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

What is claimed is:

1. A non-transitory computer-readable medium embodying at least one program executable in a tunnel endpoint, the tunnel endpoint providing a gateway to a software defined network, the at least one program, when executed by the tunnel endpoint, being configured to cause the tunnel endpoint to at least:
   cause an encryption key to be deployed to a client device, wherein the client device is external to the software defined network and configured with a virtual private network (VPN) configuration from a management service with which the client device is enrolled as a managed device, the VPN configuration identifying the encryption key and an address of the tunnel endpoint;
   cause the encryption key to be deployed to at least one endpoint internal to the software defined network, wherein the at least one endpoint uses the encryption key to encrypt communications within the software defined network and with the client device;
   obtain a packet from the client device that is encrypted using the encryption key, the packet associated with an endpoint within the software defined network;
   determine, based upon the packet encrypted using the encryption key, that the client device is non-compliant with at least one compliance rule based upon a packet header associated with the packet; and
   cause revocation of the encryption key deployed to the client device by issuing a new encryption key to the at least one endpoint internal to the software defined network, wherein the at least one endpoint uses the new encryption key for communications within the software defined network and external to the software defined network.

2. The non-transitory computer-readable medium of claim 1, wherein the at least one program further causes the tunnel endpoint to at least:
   subsequently determine that the client device is compliant with the at least one compliance rule; and
   issue the new encryption key to the client device.

3. The non-transitory computer-readable medium of claim 1, wherein the at least one program determines that the client device is non-compliant based upon a geolocation of the client device, a network type associated with the client device, or a device posture determined from data embedded within the packet header.

4. The non-transitory computer-readable medium of claim 1, wherein the tunnel endpoint causes revocation of the encryption key by issuing a third encryption key to the client device, wherein an encryption level associated with the third encryption key is stronger than the encryption key that is revoked.

5. The non-transitory computer-readable medium of claim 4, wherein the tunnel endpoint causes revocation of the encryption key by causing the management service to issue a third encryption key to the client device, wherein the encryption level associated with the third encryption key is stronger than the encryption key that is revoked.

6. The non-transitory computer-readable medium of claim 1, wherein the tunnel endpoint causes revocation of the encryption key by discarding subsequent packets received from the client device that are encrypted using the encryption key.

7. A system, comprising:
   at least one computing device; and
   an application executable by the at least one computing device, the application configured to cause the at least one computing device to at least:
   cause an encryption key to be deployed to a client device, wherein the client device is external to a protected network and configured with a virtual private network (VPN) configuration from a management service with which the client device is enrolled as a managed device, the VPN configuration identifying the encryption key and an address of the tunnel endpoint;

cause the encryption key to be deployed to at least one endpoint internal to the protected network, wherein the at least one endpoint uses the encryption key to encrypt communications within the protected network and with the client device;

obtain a packet from the client device that is encrypted using the encryption key, the packet associated with an endpoint within the protected network;

determine, based upon the packet encrypted using the encryption key, that the client device is non-compliant with at least one compliance rule based upon a packet header associated with the packet; and cause revocation of the encryption key deployed to the client device by issuing a new encryption key to the at least one endpoint internal to the protected network, wherein the at least one endpoint uses the new encryption key for communications within the protected network and external to the protected network.

8. The system of claim 7, wherein the application causes the at least one computing device to at least:
subsequently determine that the client device is compliant with the at least one compliance rule; and
issue the new encryption key to the client device.

9. The system of claim 7, wherein determining that the client device is non-compliant is based upon a geolocation of the client device, a network type associated with the client device, or a device posture determined from data embedded within the packet header.

10. The system of claim 7, wherein the at least one computing device causes revocation of the encryption key by causing the management service to issue a third encryption key to the client device, and an encryption level associated with the third encryption key is stronger than the encryption key that is revoked.

11. The system of claim 7, wherein the at least one computing device causes revocation of the encryption key by causing the management service to issue a third encryption key to the client device, and an encryption level associated with the third encryption key is stronger than the encryption key that is revoked.

12. The system of claim 7, wherein the at least one computing device causes revocation of the encryption key by discarding subsequent packets received from the client device that are encrypted using the encryption key.

13. A method implemented in a at least one computing device comprising:
causing an encryption key to be deployed to a client device, wherein the client device is external to a protected network and configured with a virtual private network (VPN) configuration from a management service with which the client device is enrolled as a managed device, the VPN configuration identifying the encryption key and an address of the tunnel endpoint;
causing the encryption key to be deployed to at least one endpoint internal to the protected network, wherein the at least one endpoint uses the encryption key to encrypt communications within the protected network and with the client device;
obtaining a packet from the client device that is encrypted using the encryption key, the packet associated with an endpoint within the protected network;
determining, based upon the packet encrypted using the encryption key, that the client device is non-compliant with at least one compliance rule based upon a packet header associated with the packet; and
causing revocation of the encryption key deployed to the client device by issuing a new encryption key to the at least one endpoint internal to the protected network, wherein the at least one endpoint uses the new encryption key for communications within the protected network and external to the protected network.

14. The method of claim 13, further comprising
subsequently determining that the client device is compliant with the at least one compliance rule; and
issuing the new encryption key to the client device.

15. The method of claim 13, wherein determining that the client device is non-compliant is based upon a geolocation of the client device, a network type associated with the client device or a device posture determined from data embedded within the packet header.

16. The method of claim 13, wherein causing revocation of the encryption key further comprises issuing a third encryption key to the client device, and an encryption level associated with the third encryption key is stronger than the encryption key that is revoked.

17. The method of claim 13, wherein causing revocation of the encryption key further comprises causing the management service to issue a third encryption key to the client device, and an encryption level associated with the third encryption key is stronger than the encryption key that is revoked.

* * * * *